(No Model.)
T. R. FERRALL.
SNATCH BLOCK.
No. 389,557. Patented Sept. 18, 1888.
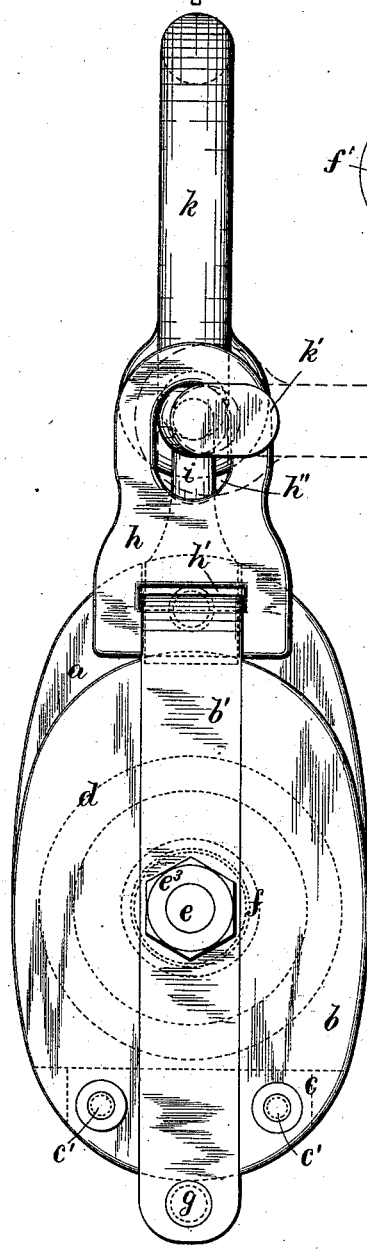
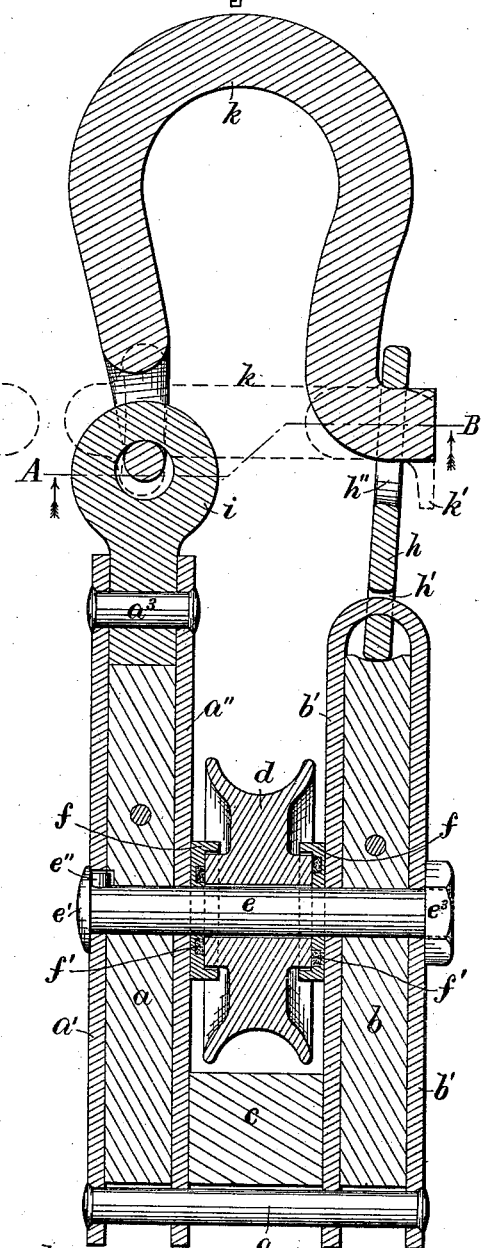
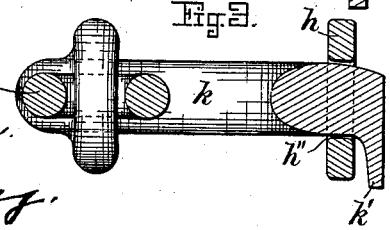
Witnesses
Henry Chadbourn
Charles H. Figg
Inventor
Thomas R. Ferrall
by Alban Andrew, his atty.

UNITED STATES PATENT OFFICE.

THOMAS R. FERRALL, OF BOSTON, MASSACHUSETTS.

SNATCH-BLOCK.

SPECIFICATION forming part of Letters Patent No. 389,557, dated September 18, 1888.

Application filed May 15, 1888. Serial No. 273,953. (No model.)

*To all whom it may concern:*

Be it known that I, THOMAS R. FERRALL, a citizen of the United States, and a resident of Boston, in the county of Suffolk and State of Massachusetts, have invented new and useful Improvements in Snatch-Blocks, of which the following, taken in connection with the accompanying drawings, is a specification.

This invention relates to improvements in snatch-blocks, and it is carried out as follows, reference being had to the accompanying drawings, wherein—

Figure 1 represents a front elevation of the improved block, shown with its bail-hook in a locked position. Fig. 2 represents a central longitudinal section of the same. Fig. 3 represents a cross-section on the broken line A B, shown in Fig. 2; and Fig. 4 represents an interior view of one of the end bearings for the sheave.

Similar letters refer to similar parts wherever they occur on the different parts of the drawings.

$a$ and $b$ represent the wooden cheek-pieces, as usual, and $c$ represents the end piece, secured to and between the lower ends of the cheek-pieces by means of rivets $c'$ $c'$, or in any other suitable or equivalent manner.

The cheek and end pieces, although represented as being made of wood, may, if so desired, be made of metal without departing from the essence of my invention.

$a'$ and $a''$ are straight metal straps located in vertical recesses, respectively, on the outside and inside of the cheek-piece $a$, as shown in Fig. 2.

$b'$ $b'$ is a metal bow-strap fitted in vertical recesses on the inside and outside of the cheek-piece $b$, as shown in Figs. 1 and 2.

$d$ is the sheave, loosely journaled on the stationary pin or spindle $e$, that passes through perforations in the straps $a'$ $a''$, the bow-strap $b'$ $b'$, and cheek-pieces $a$ $b$, as shown in Fig. 2.

$e'$ is the head of the spindle $e$, said head having on its upper side a lip or projection, $e''$, fitting in a corresponding notch or recess in the outer strap, $a'$, so as to prevent the spindle $e$ from turning around its axis. The opposite outer end of the spindle $e$ is screw-threaded and provided with a fastening-nut, $e^3$, as shown in Figs. 1 and 2, so as to permit the easy removal of said spindle, the sheave, and its end bearings for repairs or otherwise.

For the purpose of preventing the sheave from moving sidewise and from coming in contact with the interior of the cheek-pieces $a$ $b$ and their straps, as well as for the purpose of keeping the ends of the hub of the sheave properly lubricated, so as to cause it to move with the least frictional resistance, I locate on the spindle $e$, between the ends of the sheave-hub and the interior portion of the bow-strap $b'$ and the strap $a''$, respectively, the cup-shaped metal washers $f$ $f$, that are held stationary on the spindle $e$, said washers having on their insides a series of recesses or depressions adapted to receive metalline or other suitable or equivalent lubricating material, as shown in Figs. 2 and 4, for the purpose as stated.

The lower ends of the straps $a'$ $a''$ and bow-strap $b'$ $b'$ are made to project below the cheek and end pieces, $a$ $b$ $c$, as shown in Figs. 1 and 2, and are there secured together by means of the rivet or bolt $g$, that passes through perforations made in said lower ends of the straps $a'$ $a''$ $b'$ $b'$, below the lower ends of the cheek and end pieces, by which arrangement the bolt or rivet $g$ is made to pass outside of and not through such cheek and end pieces, by which greater strength is obtained on account of not perforating the said cheek and end pieces at this place.

To the upper bow of the bow-strap $b'$ $b'$ is loosely pivoted the metal link $h$, having a slotted perforation, $h'$, near its lower end for receiving the bow-strap $b'$ $b'$, as shown in Figs. 1, 2, and 3. Through the upper end of the link $h$ is made a vertical slot, $h''$, adapted to receive the free end of the bail-hook, as will hereinafter be described.

Between the upper ends of the straps $a'$ $a''$ is secured, by means of a rivet, $a^3$, the shank of the eye $i$, to which is loosely hinged the bail-hook $k$, having in its free end a side lip or projection, $k'$, (shown in Figs. 1 and 3 and in dotted lines in Fig. 2,) which is of a size nearly corresponding to that of the slot $h''$ in the link $h$, so that when the bail-hook $k$ is swung to one side, as shown in dotted lines in Figs. 1 and 2, and with the projection or lip $k'$ pointing downward, the link $h$ may be swung freely outward, thus liberating the bail-hook $k$ from said link and enabling the rope to be placed over the pulley $d$. After the rope is placed in position within the block and while the bail-hook $k$ is held in the position shown by dotted lines in Figs. 1 and 2, the link $h$ is swung to the position shown in Figs. 1, 2, and 3, causing it to be slipped over the free end of said bail-hook, after which the latter is swung to the position shown in Figs. 1 and 2, when the lip $k'$ will be swung outside of and to one side of the slot $h''$ in the link $h$, thus keeping the bail-hook and link properly locked together, as shown.

The bail-hook can only be detached from the link $h$ by swinging it to one side at a right angle to the block with the lip $k'$ pointing downward, as shown in dotted lines in Figs. 1 and 2, and thus preventing its unlocking in any other position.

By having an eye, $i$, secured to the straps $a'$ $a''$, instead of employing a bow strap similar to the bow-strap $b' b'$, the bail-hook $k$ is hinged to the cheek-piece $a$, with the utmost freedom of automatic adjustment to the strain of the rope, and by such connection the said bail-hook may be swung with the greatest ease and speed while in the act of locking it to or unlocking it from the link $h$.

Heretofore in snatch-blocks the hook has been pivoted to a head which was pivoted to a link hinged to the cheek-piece; and it will be seen that with my construction I dispense entirely with such head and use instead a bail-hook hinged directly to an eye secured to one of the cheek-pieces, and having means in its opposite free end for locking it to the slotted link that is pivoted to the bow-strap $b' b'$, thus materially simplifying and increasing the strength of the device.

Having thus fully described the nature, construction, and operation of my invention, I wish to secure by Letters Patent and claim—

1. In a block, the sheave $d$ and spindle $e$, combined with cheeks $a$ $b$, and the lubricating anti-frictional washers $f$ $f$, having recesses or depressions for receiving the lubricant $f'$, substantially in a manner and for the purpose set forth.

2. In a snatch-block, the bail-hook $k$, hinged in one end to one of the cheek-piece connections, and having a lip or projection, $k'$, in its free end, adapted to be locked to a slotted link pivoted to the opposite cheek-piece connection, substantially as and for the purpose set forth.

3. In a snatch-block, the spindle $e$ and its sheave $d$, combined with the cheek-piece $a$, having the independent straight straps $a'$ $a''$, and eye $i$, connected to the same for receiving the eye of the bail-hook, and the cheek-piece $b$, having the bow-strap $b' b'$, and slotted link pivoted to the latter, for receiving the free end of the bail-hook, substantially as and for the purpose set forth.

4. A snatch-block consisting of the cheek-piece $a$ and its straps $a'$ $a''$, and eye $i$, secured to the same, the cheek-piece $b$ and its bow-strap $b' b'$, the link $h$, pivoted to the latter and having slot $h''$ in its upper end, the bail-hook $k$, pivoted or hinged in one end to the eye $i$, and having a lip or projection, $k'$, in its free end, as described, and the spindle $e$, with its sheave $d$, substantially as and for the purpose set forth.

5. In a pulley-block, the cheek-pieces, sheave, and spindle, as described, combined with cup-shaped washers $f$ $f$, arranged upon the spindle between the ends of the sheave and the interior faces of the respective cheek-pieces, substantially as and for the purpose set forth.

In testimony whereof I have signed my name to this specification, in the presence of two subscribing witnesses, on this 10th day of May, A. D. 1888.

THOMAS R. FERRALL.

Witnesses:
ALBAN ANDRÉN,
HARRY W. ROBINSON.